United States Patent [19]
Yamaguchi

[11] 3,818,340
[45] June 18, 1974

[54] ELECTRONIC WATT-HOUR METER WITH DIGITAL OUTPUT REPRESENTING TIME-INTEGRATED INPUT

[75] Inventor: Keiki Yamaguchi, Mushashino, Japan

[73] Assignee: Yokogawa Electric Works, Ltd., Tokyo, Japan

[22] Filed: Mar. 22, 1972

[21] Appl. No.: 237,067

[30] Foreign Application Priority Data
Mar. 26, 1971 Japan.............................. 46-18283

[52] U.S. Cl.............................. 324/142, 324/99 D
[51] Int. Cl. ........................................... G01n 21/00
[58] Field of Search........ 324/142, 99 R, 99 D, 161; 328/160, 158

[56] References Cited
UNITED STATES PATENTS

| | | | |
|---|---|---|---|
| 3,500,109 | 3/1970 | Sugiyama et al. | 324/99 R |
| 3,500,200 | 3/1970 | Woodhead | 324/142 |
| 3,517,311 | 6/1970 | Wasielewski | 324/142 |
| 3,599,154 | 8/1971 | Carol et al. | 324/161 |
| 3,623,073 | 11/1971 | Wheable et al. | 324/99 D |
| 3,718,860 | 2/1973 | Kwast | 324/142 |

OTHER PUBLICATIONS
Tomota et al., IEEE Trans. Instruments and Measure, Vol. 1M-17, No. 4, December 1968, pp. 245-251.

*Primary Examiner*—Alfred E. Smith
*Attorney, Agent, or Firm*—Bryan, Parmalee, Johnson & Bollinger

[57] ABSTRACT

An electronic meter, such as a watt-hour meter, arranged to process an input signal which has an amplitude varying instantaneously with time, such as a wattage signal, and to provide a digital output signal representing the time-integrated value of the input signal, for example, a digital output representing accumulated watt-hours of electrical power. The meter applies the time-varying input signal to a pulse width modulating means to convert the input signal into a pulse signal in which the pulse width varies in correspondence to the amplitude of the input signal. The modulated pulse signal drives a gating circuit which controls the application of a steady clock pulse signal from a generator to a pulse counting means providing a digital signal output representing the cumulative total of clock pulses applied thereto through the gating circuit. The gating circuit, in response to the modulated pulse signal, applies a proportion of the total clock pulses which corresponds in number to the time-integrated value of the input signal, thereby providing the desired digital watt-hour output.

12 Claims, 6 Drawing Figures

ELECTRONIC WATT-HOUR METER WITH DIGITAL OUTPUT REPRESENTING TIME-INTEGRATED INPUT

BACKGROUND OF THE INVENTION

1. Field of the Invention

This invention relates to a meter, such as a watt-hour meter, designed to receive a time varying input signal and to derive an output signal representing the time-integrated value of the input signal.

2. Description of the Prior Art

The conventional watt-hour meter, in both domestic and commercial use, employs mechanical parts to drive one or more gauges indicating electrical consumption. Because the devices are mechanical, they involve problems with respect to accuracy, stability and wear. These devices are unsatisfactory where great accuracy is needed, and there is considerable difficulty encountered in obtaining an electrical signal which represents the accumulated watt-hours and which can be used, for example, to control instrumentation of various kinds.

SUMMARY OF THE INVENTION

Objects of the present invention are to provide a meter, such as a watt-hour meter, of the type receiving a time-varying input signal, such as a wattage signal, and deriving an output signal representing the time-integrated value of the input signal, and which is capable of accurate and stable operation, which is capable of being constructed of electronic elements alone, which is capable of providing a direct output in the form of an electrical signal, and in which the output is in digital form to facilitate its use.

According to the invention, the electronic time-integrating meter, such as a watt-hour meter, comprises pulse width modulating means for converting the time-varying input signal into a pulse signal in which the pulse width varys in correspondence to the amplitude of the input signal. A clock pulse generator generates a steady clock pulse signal, and pulse counting means are provided for cumulatively counting the number of clock pulses applied thereto and for providing a digital signal output representing the cumulative number of clock pulses counted. The steady clock pulse signal is applied to the pulse counting means through a gating means which is responsive to the modulated pulse signal to apply a portion of the clock pulses which corresponds to the widths of the pulses in the modulated pulse signal, so that the total number of such pulses applied to the pulse counting means is representative of the time-integrated value of the input signal.

In further aspects of the time-integrating meter of the present invention, the pulse width modulator includes an addition integrator adapted to be switched between alternate bias voltages for periods of time which are related to magnitude of the input signal to thereby provide pulse width modulation. In one such pulse width modulator, the correspondence between the pulse width modulated signal and the input signal is such that the time difference between the pulse duration and the remainder of the signal cycle is proportional to the time-integrated value of the input signal, and the gate means is arranged to apply the number of clock pulses occurring during this time difference to the pulse counting means. The gate means operates, for example, by applying clock pulses additively to the counter during the pulse width and subtractively to the counter during the remainder of the cycle, or by applying clock pulses to a first counter during the pulse duration, to a second counter during the remainder of the cycle, and then subtracting the outputs of the first and second counters. In another pulse width modulator, the correspondence between pulse width and the input signal is such that the pulse width directly represents the time-integrated value of the input signal, and the gating means applies clock pulses to the counting means for the duration of the modulated pulse signal.

Other objects, aspects and advantages of the invention will be pointed out in, or apparent from, the detailed description hereinbelow, considered together with the following drawings.

DESCRIPTION OF THE PREFERRED EMBODIMENTS

Figure 1:
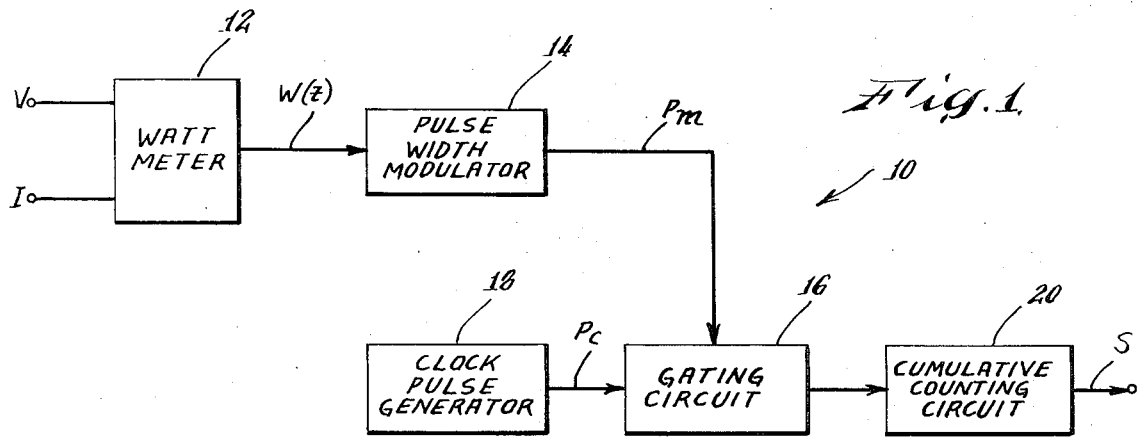
FIG. 1 is a block diagram illustrating a watt-hour meter according to the present invention.
Figure 2:
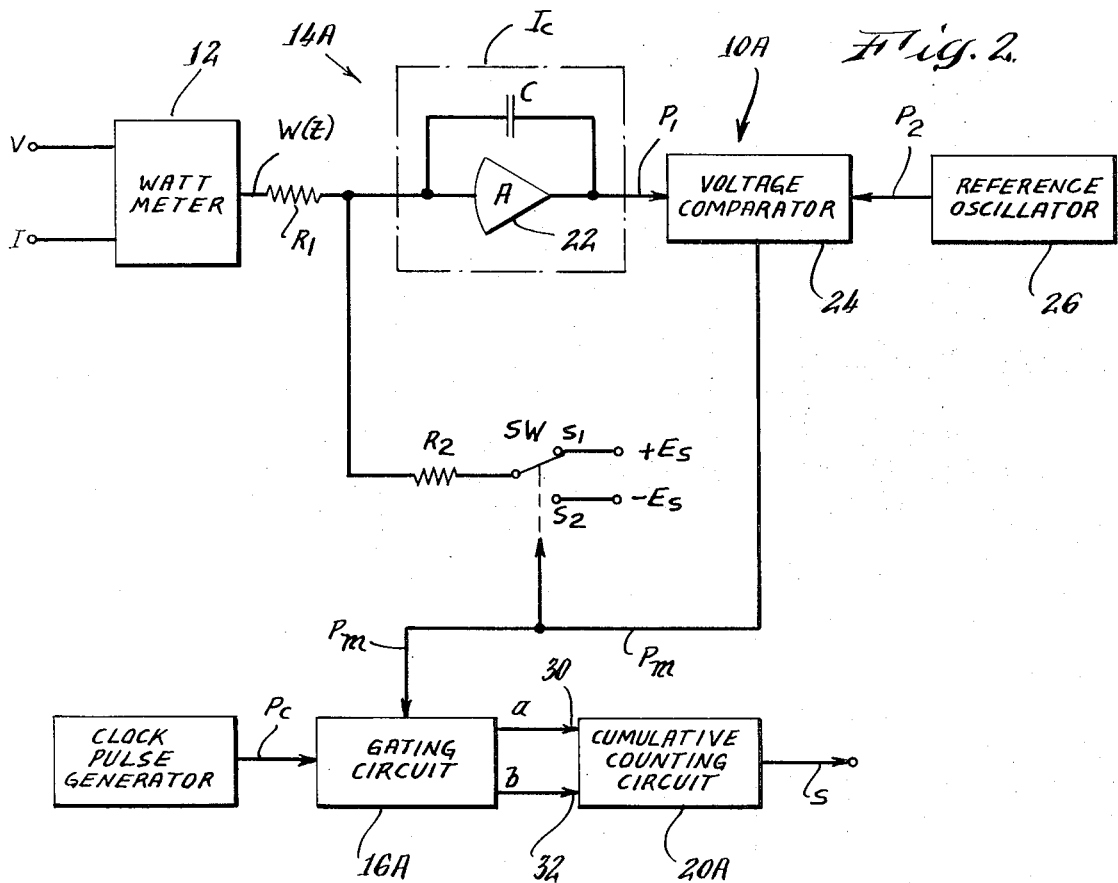
FIG. 2 is a partially schematic diagram of one embodiment of the invention.

FIG. 1 illustrates, in block form, a watt-hour meter 10 in accordance with the present invention, in which a wattage signal $W(t)$, varying instantaneously with time, is derived from a watt meter 12 having appropriate voltage V and current I inputs. The time-varying wattage signal $W(t)$ serves as the input to a pulse width modulator 14, which converts the time-varying input $W(t)$ into a pulse signal $Pm$ in which pulse width varies linearly in correspondence with the amplitude of the time-varying input signal $W(t)$, whereby the sum of the pulse widths in the modulated pulse signal $Pm$ is proportional to the time-integrated value of the input $W(t)$. The pulse widths in signal $Pm$ are measured and summed and an appropriate output signal S is obtained from circuitry which includes a gating circuit 16, a clock pulse generator 18 originating a steady clock pulse signal $Pc$, and a cumulative counting circuit 20 which registers the cumulative total of clock pulses applied thereto and represents the total as a digital output signal S. The gating circuit 16 responds to the modulated pulse signal $Pm$ and controls the proportion of clock pulses in clock pulse signal $Pc$ which is applied to cumulative counting circuit 20. The number of clock pulses in clock pulse signal $Pc$ which is cumulatively counted in counting circuit 20 and represented by digital output signal S, being governed by pulse widths in the modulated pulse signal $Pm$, therefore accurately represents in digital form the time-integrated value of the time-varying input signal $W(t)$. As will be readily understood, the frequency of clock pulse generator 18, together with other circuit parameters, may be adjusted so that the digital output signal S is in terms of convenient units, such as kilowatt hours of energy. The circuit details of one embodiment 10A of the meter 10 are shown in FIG. 2. In this embodiment, the time varying signal W($t$) from watt meter 12 is applied to pulse width modulator 14A of the type described in U.S. Pat. No. 3,500,109 to Takashi Sugiyama et al., dated Mar. 10, 1970, and incorporated by reference. The pulse width modulator 14A comprises an amplifier 22 and feed back capacitor C together forming an integrating circuit Ic. The input signal W($t$) is applied to integrating circuit Ic through a resistor R1, and bias or reference voltages +E$s$ and −E$s$ are alternately applied by a switch SW through a resistor R2 to integrating circuit Ic. The output of integrating circuit Ic is a voltage signal P1 which is compared in a comparator 24 with a triangular reference signal P2 originating in reference oscillator 26.

Comparator 24 compares the magnitude of signals P1 and P2 and provides an output which controls switch SW so as to cause reference voltage +E$s$ to be connected to the integrating circuit Ic through switch contact S1 whenever signal P1 is greater than signal P2, and to cause reference voltage −E$s$ to be connected to integrating circuit Ic through switch contact S2 whenever signal P2 is greater than signal P1. The ouput of comparator 24, as will be explained below, provides the modulated pulse signal P$m$ which governs the operation of gating circuit 16A.

Figure 3:
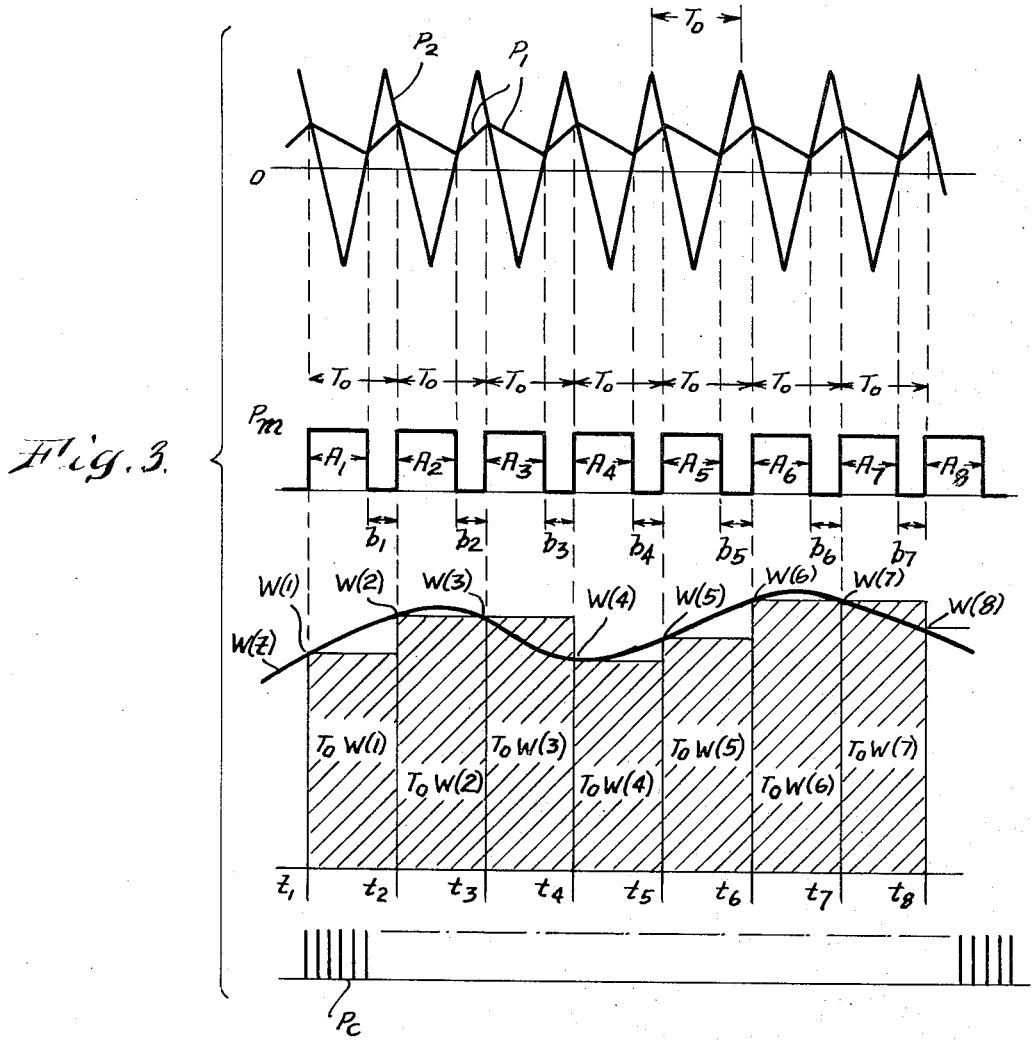
FIG. 3 is a graph illustrating wave forms appearing in the circuit of FIG. 2.

Pulse width modulator 14A operates as follows:
The integrator Ic functions as an addition integrator and integrates an input voltage of either W($t$) + E$s$ or W($t$) −E$s$ depending upon the position of transfer switch SW. The output signal P1 from integrator Ic decreases when the input is W($t$) + E$s$, and increases when the input is W($t$) − E$s$. As shown in FIG. 3, the reference signal P2 is a triangular wave of zero mean value with a period T$o$. The voltage comparator 24 compares the signal P1 from the integrator Ic with the triangular signal P2 and generates the output signal P$m$ shown in FIG. 3. During the period $a$, while the integrator output signal P1 is greater than the triangular signal P2, the reference voltage + E$s$ is applied to integrator Ic to cause the signal P1 to decrease. Similarly, during the period $b$, while the integrator output signal P1 is smaller than the triangular reference signal P2, reference voltage − E$s$ is applied to cause the integrator output signal P1 to increase. The triangular signal P2 is selected to have sufficient magnitude so that the integrator output signal P1 is always intercepted twice during each period T$o$, and therefore the frequency of the modulated pulse signal P$m$ is the same as the frequency of the triangular signal P2. As mentioned above, the mean value of the triangular signal P2 is zero. The voltage comparator 24 drives transfer switch SW so that the mean value of the sum of the input voltages to the integrator Ic becomes zero. In other words, during every period of time T$o$, $$W(t)/R1 + Es/R2\, a/T0 − Es/R2\, b/To = 0 \quad (1)$$

Or, $$a − b/To = R2/R1\, W(t)/Es \quad (2)$$

where $a + b = To$.

Equation 2 reveals that the ratio of the switching time interval difference $a − b$ to the cycle period T$o$ is proportional to the time-varying input signal W($t$), and hence the pulse signal P$m$ has pulse width modulated in correspondence to the amplitude of input signal W($t$).

Over the course of many periods T$o$, the following relationship exists, assuming that the input signal W($t$) has values of W(1), W(2), W(3), . . . W($n$), at times $t1, t2, t3, \ldots tn$, and the respective pulse widths are given by $a1, b1, a2, b2, a3, \ldots, an, bn$. It follows that $$a1 − b1/To = K\, W(1) \quad (3)$$

and, in general, $$an − bn/To = K\, W(n) \quad (4)$$

where $K$ is a constant. Since $W(1)$ T$o$ represents the time-integrated value of $W(t)$ for the incremental time interval $t2 − t1$, and $W(n)$ T$o$ represents the time-integrated value of $W(t)$ for $n$th incremental time interval, it follows that, whenever the incremental period T$o$ is made sufficiently small in relation to variations in $W(t)$:

$$\sum_{1}^{n} an − bn = \sum_{1}^{n} KW(n)To \cong K \int_{t1}^{tn} W(t)dt \quad (5)$$

The meter 10A illustrated in FIG. 2 performs the summation of $an − bn$ as indicated in Equation 5, and thus derives a digital output S representative of the time-integrated value of $W(t)$, by applying the modulated pulse signal P$m$ to a gating circuit 16A which measures the intervals $a$ and $b$ with clock pulse signal P$c$. The steady clock pulse signal P$c$, as shown in FIG. 3, has a period much shorter than that of the modulated pulse signal P$m$, and therefore the individual clock pulses serve as time measuring units which can be cumulatively counted to provide the summation of time intervals $an − bn$. Gating circuit 16A is arranged to apply the clock pulse signal P$c$ to the addition input 30 of counting circuit 20A during the period $a$, and to the subtraction input terminal 32 during the period $b$. The cumulative counting circuit 20A therefore performs the summation of time intervals $an − bn$, and as indicated by Equation 5, the digital signal output S of counting circuit 20A provides an accurate digital representation of the time integrated value of the input signal W($t$).

The summation of time intervals $an − bn$ may proceed during every cycle of the triangular reference signal P2, or a sampling technique may be employed if the input signal is slowly varying. For example, the counting circuit 20A may be operated during alternate cycles, such as for the period $t2−t1$, $t4−t3$, etc. When this technique is used, however, the total count registered in counting circuit 20A is related to the time-integrated value of the input signal W($t$) by a different constant of proportionality K′.

The summation of time intervals $an−bn$ may be carried out with differently related gating circuits 16A and counting circuits 20A. For example, the gating circuit 16A may be arranged to derive a single gating signal existing for the time interval equal to the difference between intervals $a$ and $b$, and the new gating signal may be used to apply clock pulses to the additive terminal 30 of counting circuit 20A whenever interval $a$ is greater than interval b, or to the subtractive terminal 32 when interval a is less than interval b.

Figure 4:
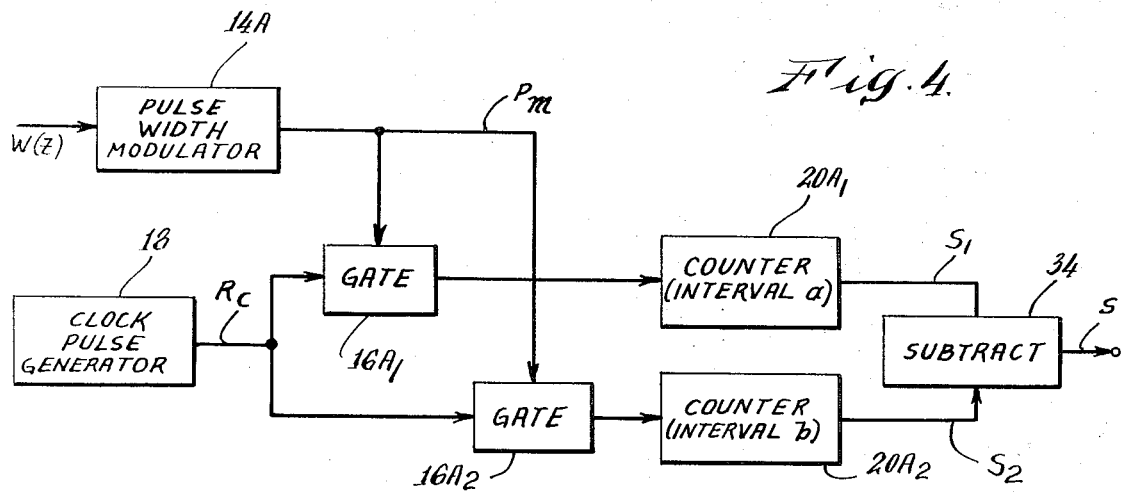
FIG. 4 is a diagram illustrating a modification of the circuit shown in FIG. 2.

Another circuit for performing the summation of time intervals $an - bn$ is illustrated in FIG. 4. In this circuit, clock pulses from generator 18 are applied during interval a through a first gate portion 16A1 to a first counter 20A1 which accumulates the number of clock pulses applied thereto and has an output signal S1 representing the number of counted pulses, and clock pulses are applied during the interval b through a second gate portion 16A2 to a second counter 20A2 which accumulates the number of clock pulses applied thereto and has an output signal S2 representing the number of counted pulses. The output signals S1 and S2 are applied to a subtracting circuit 34, and the difference between the counted values is obtained as the digital signal S representing the time integrated value of the input signal W(t).

Figure 5:
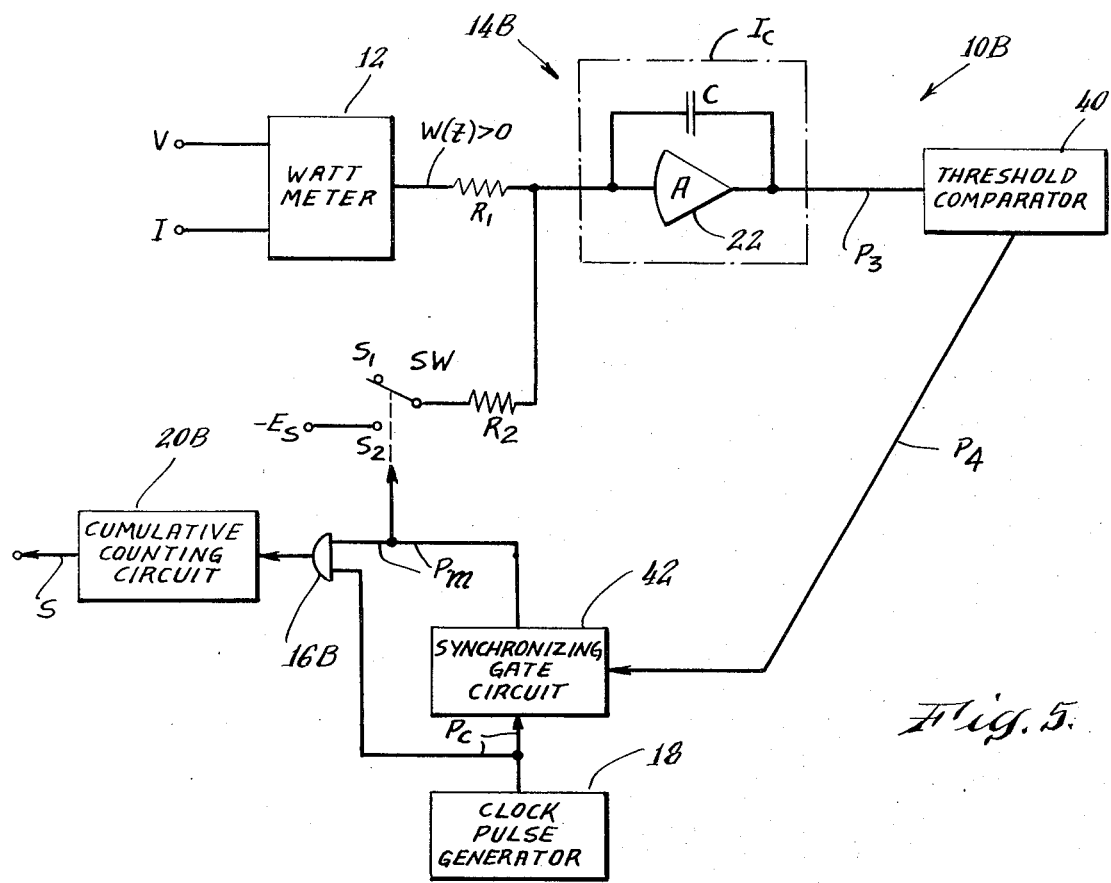
FIG. 5 is a partially schematic diagram illustrating another embodiment of the invention.

FIG. 5 illustrates another meter 10B according to the invention which employs a pulse width modulator 14B of different construction. Pulse width modulator 14B comprises, as in pulse modulator 14A described above, an integrating circuit Ic formed with amplifier 22 and capacitor C, an input resistor R1 for input signal W(t), an input resistor R2 for a reference signal, and a transfer switch SW for controlling the sequence signal. However, in modulator 14B, assuming input signal W(t) is of positive single polarity, only a single reference voltage $-Es$ is alternately switched by switch SW to be combined with input signal W(t) at the input of integrator Ic. The output of integrator Ic is a signal P3 which is applied to a threshold comparator 40 having an output signal P4 whenever the signal P3 is greater than the threshold level of comparator 40. The comparator output signal P4 is applied to a synchronizing gate circuit 42 which also receives the clock pulse signal Pc from clock pulse generator 18. Synchronizing gate circuit 42 is arranged so that its output changes in response to comparator output P4, but only upon the next clock pulse following a change in the comparator output P4. This operation is illustrated graphically in FIG. 6, which shows that the output of synchronous gate circuit 42, which forms modulated pulse signal Pm, changes state upon the occurrence of the first clock pulse following a change of state of comparator output signal P4. As a result, the modulated pulse signal Pm has a pulse width which is always an integral multiple of the period To of the clock pulse signal Pc.

As shown in FIG. 5, the output of synchronous gate circuit 42 drives switch SW, closing the switch to apply an input of $W(t) - Es$ to integrator Ic whenever the integrator output signal P3 is less than the threshold level of comparator 40. Switch SW opens upon the first occurrence of a clock pulse after threshold level of comparator 40 is exceeded, and again closes upon the occurrence of the first clock pulse after the threshold level exceeds the integrator output P3. In this manner, the integrator Ic, voltage comparator 40, and switch SW constitute a feedback loop for the input voltage W(t). Thus the conducting time of the switch SW is controlled so that the sum of every integration value of W(t) of the integrator Ic and the voltage of the reference source -Es applied for each period where the switch SW is conducting becomes zero (or stays within a certain constant range centering zero as a result of delays in switching caused by synchronous gate circuit 42). The duration of the output signal from synchronous gate circuit 42, which is the width of the pulses in modulated pulse signal Pm, thus represents the time-integrated value of the input signal W(t) and measurement of this pulse width will provide an accurate representation of the time integrated value of the input signal W(t).

Figure 6:
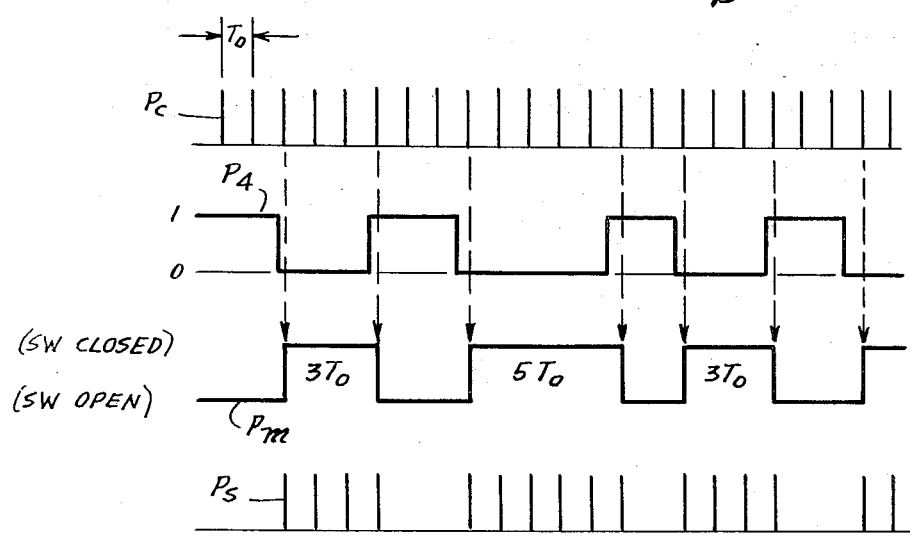
FIG. 6 is a graph illustrating wave forms appearing in the circuit of FIG. 5.

Measurement of pulse width in the modulated pulse signal Pm is carried out by using the modulated pulse signal Pm to gate an AND gate 16B to produce a pulse signal P5 as shown in FIG. 6. A counter 20B counts the pulses in signal P5 and has a digital output S representing the cumulative total of such pulses, which corresponds to the time-integrated value of the input signal W(t).

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. An electronic time-integrating meter, such as a watt-hour meter, arranged to process an input signal varying its amplitude instantaneously with time, and to provide an output signal digitally representing the integral of the input signal with respect to time, subsequent to a starting time serving as the lower limit of integration, comprising:

pulse width modulating means for converting the input signal into a pulse signal in which the pulse width varies in correspondence to the amplitude of the input signal; and cumulative digital time measuring means responsive to the pulse width modulating means for digitally measuring pulse widths in said modulated pulse signal and for accumulating said digital pulse width measurements occurring subsequent to said starting time to provide a totalled digital number representing the integral of the input with respect to time with said starting time as the lower limit of integration, said cumulative digital time measuring means including:

a clock pulse generator for generating a clock pulse signal with a constant pulse rate;

pulse counting means for cumulatively counting the number of clock pulses applied thereto subsequent to said starting time and for providing a digital signal output indicating the cumulative number of clock pulses counted there subsequent to said starting time; and gating means responsive to the modulated pulse signal for applying to the counting means a portion of the clock pulse signal which corresponds to the widths of the pulses in the modulated pulse signal, whereby the total number of clock pulses applied to the counting means and indicated by the digital signal output is representative of the integral of the input signal with respect to time subsequent to said starting time.

2. An electronic time-integrating meter as claimed in claim 1, wherein the pulse width modulating means comprises an addition integrator adapted to be switched between alternate reference voltage levels for intervals of time which are related to the magnitude of the input signal and thereby form a pulse signal with pulse width modulation, the correspondence between the pulse width modulated signal and the input signal being such that the time difference between said switching intervals is proportional to the time-integrated value of the input signal.

3. An electronic time-integrating meter as claimed in claim 2 wherein said gating means is arranged to apply to the counting means the number of clock pulses occurring during the time difference between said switching time intervals.

4. An electronic time integrating meter as claimed in claim 3 wherein said counting means comprises an additive input and a subtractive input, and wherein said gating means comprises means for applying clock pulses to the additive counter input during one switching time interval and to the subtractive counter input during the other switching time interval, whereby the cumulative number of clock pulses registered by said counting means corresponds to the time-integrated value of the input signal.

5. An electronic time-integrating meter as claimed in claim 3 wherein said counting means comprises a first cumulative pulse counter with an output indicating the number of pulses counted thereby, a second cumulative pulse counter with an output indicating the number of pulses counted thereby, and subtracting means responsive to the outputs of the first and second counters for deriving the difference between the number of pulses counted by each counter, and wherein said gating means comprises means for applying clock pulses to said first counter during one switching time interval, and to the second counter during the other switching time interval, whereby the difference signal in said subtracting means corresponds to the time-integrated value of the input signal.

6. An electronic time-integrating meter as claimed in claim 1, wherein said pulse width modulating means comprises an addition integrator adapted to be switched between alternate reference voltage levels for intervals of time which are related to the magnitude of the input signal, said alternating time intervals thereby providing a signal with pulse width modulation, the correspondence between the pulse width modulated signal and the input signal being such that one switching time interval is directly proportional to the time-integrated value of the input signal, and wherein the gating means is arranged to apply clock pulses to the counting means during said one time interval, whereby the accumulated count in said counting means represents the time-integrated value of the input signal.

7. An electronic time-integrating meter as claimed in claim 6 wherein said pulse width modulating means includes switching means for alternately connecting and disconnecting a reference voltage to the addition integrator, a threshold comparator responsive to the addition integrator, said switching means being responsive to the threshold comparator.

8. An electronic time-integrating meter as claimed in claim 7 further comprising synchronous gating means responsive to the threshold comparator and to the clock pulse generator for controlling said switching means, said synchronous gating means being arranged to change its output synchronously with the first clock pulse following a change in output of the threshold comparator, the output of the synchronous gating circuit controlling said switching means and forming said modulated pulse signal.

9. An electronic time-integrating watt-hour meter arranged to provide an output signal digitally representing units, such as watt-hours, of electrical energy accumulated subsequent to a starting time comprising means responsive to current and voltage for providing a wattage signal varying its amplitude instantaneously with time;

pulse width modulating means for converting the wattage signal into a pulse signal in which pulse width varies in correspondence to the amplitude of the wattage signal; and cumulative digital time measuring means responsive to the pulse width modulating means for digitally measuring pulse widths in said modulated pulse signal, for accumulating said digital pulse width measurements occurring subsequent to said starting time, and for indicating the accumulating of pulse width measurements as a digital number representing said units of electrical energy accumulated subsequent to said starting time, said cumulative digital time measuring means including:

a clock pulse generator for generating a clock pulse signal with a constant pulse rate, pulse counting means for cumulatively counting clock pulses applied there subsequent to said starting time and for indicating the cumulative count as a digital output signal, and gating means responsive to the modulated pulse signal for applying to the counting means a portion of the clock pulse signal corresponding to the width of the pulses in the modulated pulse signal, whereby the digital signal output of the counting means represents the time-integrated value of the wattage signal.

10. An electronic time-integrating watt-hour meter as claimed in claim 9, wherein said pulse width modulating means comprises an addition integrator, switching means for alternating between different reference voltage levels to be applied to the addition integrator along with the wattage signal, a triangular reference oscillator, and a voltage comparator for comparing the triangular signals of the reference oscillator with the output of the addition integrator, said switching means being responsive to the output signal from the voltage comparator, said output signal forming said modulated pulse signal with successive switching time intervals whose time difference is proportional to the time-integrated value of the wattage signal, said counting means and gating means being arranged to cumulatively count the number of clock pulses which occur during said time difference.

11. An electronic time-integrating watt-hour meter as claimed in claim 9 wherein said width modulating means comprises an addition integrator, switching means for alternately connecting and disconnecting a reference voltage to the wattage signal at the input of the addition integrator and a threshold comparator responsive to the addition integrators to provide an output signal, said switching means being responsive to the comparator output signal.

12. An electronic time integrating watt-hour meter as claimed in claim 11, wherein said pulse width modulating means further comprises synchronous gating means responsive to the comparator output signal and to the clock pulse generator for controlling said switching means, said synchronous gating means being arranged to change its output state upon the occurence of the first clock pulse following a change in the comparator output signal.

* * * * *